P. T. ZOLLARS.
CULTIVATOR.
APPLICATION FILED JULY 10, 1909.
959,683.
Patented May 31, 1910.
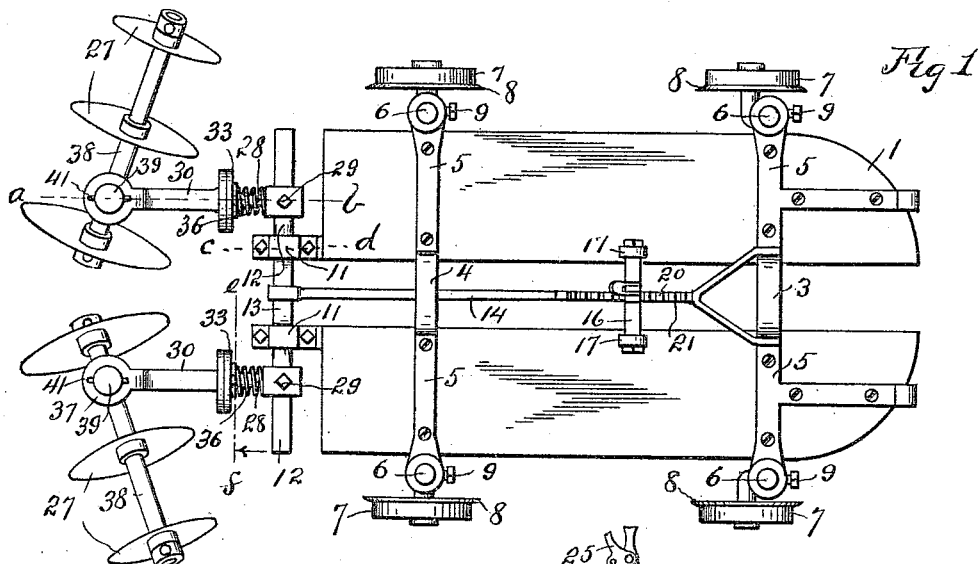
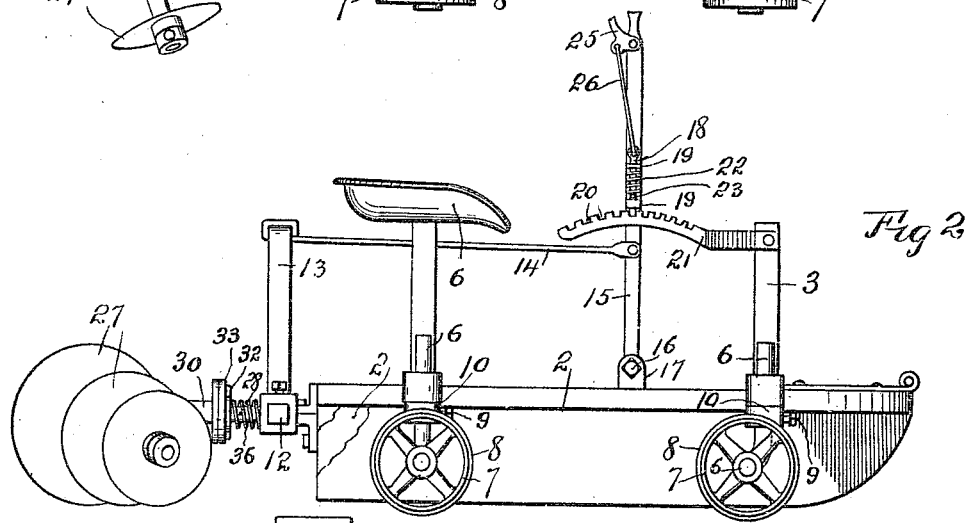
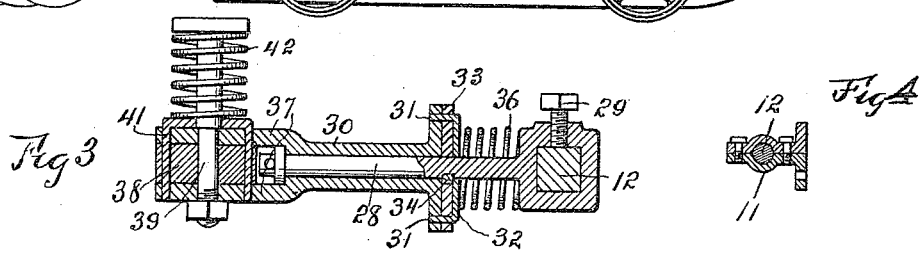
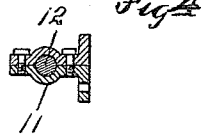
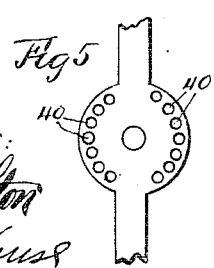
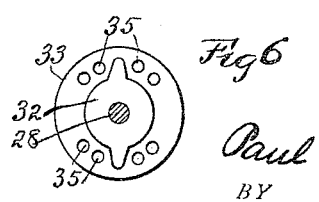
WITNESSES:
R. E. Hamilton
E. B. House
INVENTOR.
Paul T. Zollars
BY Warren D. House
His ATTORNEY.

UNITED STATES PATENT OFFICE.

PAUL T. ZOLLARS, OF EDGERTON, MISSOURI.

CULTIVATOR.

959,683.　　　　　Specification of Letters Patent.　　Patented May 31, 1910.

Application filed July 10, 1909. Serial No. 506,989.

*To all whom it may concern:*

Be it known that I, PAUL T. ZOLLARS, a citizen of the United States, residing at Edgerton, in the county of Platte and State of Missouri, have invented certain new and useful Improvements in Cultivators, of which the following is a specification.

My invention relates to improvements in cultivators.

The object of my invention is to provide, in a cultivator of the sled type, carrying wheels which are movable to and from positions in which they will carry the sled. So far as I am aware, sled cultivators have not heretofore been provided with carrying wheels so adjustable. With sled cultivators not having carrying wheels the cultivators can only be used advantageously during the first cultivation of the listed grain, afterward the furrows are not sufficiently prominent to guide the runners of the sled and another form of cultivator must subsequently be used. By providing a sled cultivator with wheels adjustable to and from a position in which they will carry the sled, no other cultivator is required to be used subsequent to the first cultivation.

Another novel feature of my invention consists in the novel mechanism by which the cultivating devices may be adjusted rotatively around axes disposed at right angles to each other, thereby enabling the operator to dispose the cultivating devices in any desired position.

Other novel features of my invention are hereinafter fully described and claimed.

In the accompanying drawings which illustrate my invention, Figure 1 is a plan view. Fig. 2 is a side elevation. Fig. 3 is a vertical section, enlarged, on the dotted line *a—b* of Fig. 1. Fig. 4 is a cross section on the dotted line *c—d* of Fig. 1. Fig. 5 is a plan view of a portion of one of the cultivator bars, enlarged. Fig. 6 is an enlarged cross section on the dotted line *e—f* of Fig. 1.

Similar characters of reference denote similar parts.

1 denotes the top of an ordinary cultivator sled, having the usual longitudinal runners 2.

3 and 4 denote respectively two inverted U-shaped bars having horizontal arms 5, secured to the top 1. On the upper end of the bar 4 is a seat 6. Vertically adjustable respectively in holes provided in the arms 5, are vertical studs 6, the lower ends of which extend horizontally outward and have respectively mounted thereon rotary carrying wheels 7, which are preferably provided with peripheral flanges 8 to prevent lateral slipping of the wheels. Secured respectively by set screws 9, on the studs 6, are collars 10, upon which respectively rest the ends of the arms 5. By loosening the set screws 9, the studs 6 may be vertically adjusted to and from a position in which the carrying wheels 7 instead of the runners carry the cultivator.

Rotatively mounted in bearings 11, secured to the rear end of the sled, is a rock shaft 12, having a crank 13 which is connected to the rear end of a horizontal rod 14, the forward end of which is pivoted to a vertical lever 15, the lower end of which is pivoted on a horizontal bolt 16, supported in two bearings 17, secured to the top 1. By swinging the lever 15 forward and backward, the operator can rock the shaft 12 so as to swing upward and downward the cultivating devices carried by said shaft. The lever 15 may be locked in the position to which it may be adjusted by a bolt 18, slidably mounted longitudinally in projections 19, provided on the lever 15, said bolt being adapted to enter notches 20, provided on the curved upper side of a plate 21, the bifurcated forward end of which is secured to opposite sides of the U-shaped plate 3. A coil spring 22, encircling the bolt 18, and bearing at its upper end against the upper projection 19, and at its lower end against a pin 23, in the bolt 18, normally forces said bolt into the notches 20. Pivotally mounted on the lever 15, above the bolt 18, and connected therewith by a rod 26, is a bell crank lever 25, by swinging which the operator withdraws the bolt 18 from the notches 20.

27 denote the cultivating devices comprising preferably ordinary rotary cultivating disks. These disks are preferably arranged in two sets, disposed at opposite sides of the longitudinal center of the sled. Each set of cultivating devices is adjustably supported on the rock shaft 12. As each supporting mechanism is like the other, a description of one will suffice for both:—The forward end of a horizontal radial arm 28, is provided with a square hole fitted to a square portion of the rock shaft 12, upon which the arm 28 is adjustable lengthwise of said shaft, to which it may be rigidly secured by a set screw 29. Rotatively mounted on the rear end of the arm 28, is a horizontal member 30, the forward end of which is provided with two holes adapted to receive two rearwardly extending projections 31, of a locking member 32, which is rotatively mounted on the arm 28, forward of a circular plate 33, provided with a central hole through which extends the arm 28, to which the plate 33 is secured by a key 34. The plate 33 is provided with a plurality of holes 35, adapted to receive therethrough the projections 31. A coil spring 36 encircles the arm 28 and has its rear end bearing against the forward side of the locking member 32, the forward end of the spring bearing against the enlarged forward end of the arm 28. By compressing the spring 36 and withdrawing the projections 31, from the plate 33, the member 30 and locking member 32, may be rotated on the arm 28 to positions desired, after which the projections 31 are inserted in the two openings 35, which register with the openings provided in the circular forward end of the member 30. The rear end of the member 30 is bifurcated and has its two arms 37 disposed one above the other. Between the arms 37 is a transverse bar 38, on which the cultivator disks 27 are rotatively mounted. A vertical bolt 39 extends vertically through holes provided therefor in the arms 37 and bar 38. The bar 38 is provided with a plurality of holes 40, disposed concentrically with the bolt 39 and adapted to receive therethrough the vertical arms of an inverted U-shaped locking member 41, the horizontal portion of which is provided with a central hole through which extends the bolt 39. The vertical arms of the locking member 41 also extend through two holes provided in each of the arms 37. A coil spring 42, encircles the bolt 39 and has its upper end bearing against the head of the bolt and its lower end against the locking member 41. By compressing the spring 42 the vertical arms of the locking member 41 may be withdrawn from the bar 38, thereby permitting said bar to be swung horizontally to the position desired, after which the spring 42 is allowed to force the locking member 41 into the openings 40, which at that time are in alinement with the holes in the arms 37.

From the above it will be understood that the bar 38 may be swung horizontally so as to dispose the cultivating disks more or less parallel with the furrows and the members 30 may be rotatively adjusted so as to swing the bars 38 to positions at greater or less angles to the horizontal.

In cultivating the drilled grain the first time, the set screws 9 are loosened and the studs 6 are moved upward to a position in which the runners 20 will support the sled. Subsequent to the first cultivation, the studs 6 are moved downward and secured by the set screws 9 in positions in which the carrying wheels 7 will support the sled.

Various modifications of my invention, within the scope of the appended claims, may be made without departing from its spirit.

Having thus described my invention, what I claim and desire to secure by Letters Patent, is:—

1. In a cultivator, the combination with a rock shaft, of an arm secured radially thereto, a member secured rotatively on the arm and having a hole, a plate secured rigidly to the arm and having a plurality of holes concentric with the arm, a locking device rotative on the arm and movable lengthwise thereon into and out of the holes in the plate and said member, a spring for normally forcing the locking device into said holes, and means for supporting cultivating devices on said member.

2. In a cultivator, the combination with a rock shaft, of an arm secured radially thereto, cultivating devices, a member rotative on said arm and having a hole, a plate secured rigidly to the arm and having a plurality of holes concentric with the arm, a locking device movable lengthwise into and out of said holes of the member and plate, a spring for forcing said device into said holes, a bar pivoted on said member and supporting said cultivating devices, and locking means for locking said bar in the position to which it may be adjusted.

3. In a cultivator, the combination with a plurality of cultivating devices, of a rock shaft, an arm secured radially to said shaft, a member rotative on said arm to different positions, releasable means for locking the member in said positions, the member having a hole, a bar supporting said cultivating devices and pivoted to said member and having a plurality of holes concentric with the axis of said bar, a locking device movable into and out of the holes of said bar and said member, and a spring for forcing the locking device into said holes.

4. In a cultivator, the combination with cultivating devices, of a rock shaft, an arm secured rigidly to the rock shaft, a member rotative on said arm and having two holes, a plate secured rigidly on said arm and having a plurality of holes concentric with the arm and adapted to register with one of the holes of the arm, a locking device insertible into the holes of the plate and the adjacent hole in said member, a spring for holding said locking device in locked position, a bar supporting said cultivating devices, and pivoted to said member, the bar having a plurality of holes concentric with its axis and adapted to register with the other hole of said member, a second locking device adapted to be inserted into said holes of said bar and the adjacent hole in said member, and a spring for forcing said last named locking device into the locked position.

5. In a cultivator, the combination with cultivating devices, of a rock shaft, a radial arm secured to said rock shaft, a member rotative on said arm and having two sets of holes, a plate secured rigidly to said arm and having holes concentric with the arm adapted to register with one set of holes in said member, a locking member rotative on said arm and having two projections adapted to respectively enter one set of holes and the two holes adjacent thereto of said plate, a bar pivoted to said member, a second locking member having two projections adapted to respectively enter the other two holes in said member and the adjacent holes in said bar, and a spring for normally holding said second locking member in the locked position.

In testimony whereof I have signed my name to this specification in presence of two subscribing witnesses.

PAUL T. ZOLLARS.

Witnesses:
ANDREW J. HOLADAY,
FRED HEATH.